(12) United States Patent
Magini et al.

(10) Patent No.: US 9,395,735 B2
(45) Date of Patent: Jul. 19, 2016

(54) CONTROL UNIT FOR AN ELECTRIC MACHINE

(71) Applicant: Robert Bosch GmbH, Stuttgart (DE)

(72) Inventors: Fabio Magini, Hemmingen (DE); Paul Mehringer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 362 days.

(21) Appl. No.: 13/958,948

(22) Filed: Aug. 5, 2013

(65) Prior Publication Data

US 2014/0039705 A1 Feb. 6, 2014

(30) Foreign Application Priority Data

Aug. 6, 2012 (DE) .......................... 10 2012 213 908

(51) Int. Cl.
| | |
|---|---|
| *G05F 1/66* | (2006.01) |
| *H02M 1/36* | (2007.01) |
| *H02M 7/5387* | (2007.01) |
| *H02M 7/5395* | (2006.01) |
| *H02M 1/32* | (2007.01) |

(52) U.S. Cl.
CPC . *G05F 1/66* (2013.01); *H02M 1/36* (2013.01); *H02M 7/5387* (2013.01); *H02M 7/5395* (2013.01); *H02M 2001/327* (2013.01)

(58) Field of Classification Search
None
See application file for complete search history.

(56) References Cited

U.S. PATENT DOCUMENTS

| | | | |
|---|---|---|---|
| 2005/0242759 A1 | 11/2005 | Fujino et al. | |
| 2009/0033294 A1 | 2/2009 | Odajima et al. | |
| 2009/0039813 A1* | 2/2009 | Yamada | H02P 21/0032 318/434 |
| 2011/0273141 A1 | 11/2011 | Kanbayashi et al. | |
| 2012/0293102 A1* | 11/2012 | Kock | B25J 9/126 318/473 |
| 2014/0015461 A1* | 1/2014 | Ohba | H02P 6/20 318/472 |

* cited by examiner

*Primary Examiner* — Sean Shechtman
*Assistant Examiner* — Steven Garland
(74) *Attorney, Agent, or Firm* — Michael Best & Friedrich LLP

(57) ABSTRACT

A control unit for an electric machine. The control unit has a processing unit and a power output stage connected to the processing unit. The power output stage is connected to outputs of the control unit for stator coils of a stator of the electric machine. The processing unit is designed to supply current to the power output stage for generating a stator field, in particular a rotating magnetic field. The control unit comprises an electrical energy store, in particular an intermediate circuit capacitor or accumulator, connected to the power output stage. The control unit includes an input for a control signal, for example a temperature signal. The processing unit is preferably designed to actuate the power output stage as a function of the temperature signal such that the energy store can be heated by a current application pattern generated by the power output stage. The current application pattern corresponds to a stator field which cannot generate an effective torque or a rotary motion, such as a full revolution of a rotor of the electric machine.

9 Claims, 5 Drawing Sheets

CONTROL UNIT FOR AN ELECTRIC MACHINE

BACKGROUND OF THE INVENTION

The invention relates to a control unit for an electric machine. The control unit comprises a processing unit and a power output stage connected to the processing unit. The power output stage is connected to outputs of the control unit for stator coils of a stator of the electric machine. The processing unit is designed to supply current to the power output stage for generating a stator field, in particular a rotating magnetic field. The control unit comprises an electrical energy store connected to the power output stage, in particular an intermediate circuit capacitor or an accumulator.

In motor vehicles, in particular electric or hybrid vehicles, an electric machine is supplied with current during engine operation by a control unit equipped with a power output stage; thus enabling the electric machine to produce a rotating magnetic field for rotating a rotor and therefore for driving the vehicle. At cold temperatures, for example at an ambient temperature between −40 and −10 degrees Celsius, the problem exists that the power output of the power output stage is reduced in comparison to a power output at higher temperatures than the previously described low temperature range.

SUMMARY OF THE INVENTION

According to the invention, the control unit of the type mentioned above comprises an input for a control signal, in particular a temperature signal. The processing unit is preferably designed to actuate the power output stage as a function of the temperature signal such that the energy store can be heated by a current application pattern generated by the power output stage. The current application pattern preferably corresponds to a stator field, which cannot generate an effective torque or a rotary motion, in particular a full revolution of a rotor of the electric machine.

It has been particularly recognized that the power output depends especially on an internal series resistance of the intermediate circuit capacitor, which assumes such large values at low temperatures less than minus ten degrees Celsius that high voltage peaks are produced due to the voltage drop at the series resistor. Said high voltage peaks can destroy the power output stage or a driver unit of the power output stage.

The energy store, in particular the intermediate circuit capacitor of the control unit, can thus be advantageously heated by the current application pattern without an electric machine connected to the power output stage being able to produce a torque. The actuation of the electric machine performed as described can, for example, be performed prior to starting a vehicle, in particular an electric or hybrid vehicle. If the intermediate circuit capacitor has reached a predetermined temperature, for example a temperature greater than minus ten degrees Celsius, which, for example, can be acquired with the aid of a temperature sensor, a current application pattern or, respectively, an actuation model for actuating the power output stage can thus be generated by the processing unit for a specific engine operating state, said current application pattern (actuation model) causing the intermediate circuit capacitor to heat up less than the actuation model which was generated as a function of the temperature signal for low temperatures.

In a preferred embodiment, the processing unit is designed to actuate the power output stage as a function of the temperature signal in such a way that a current application pattern generated by the power output stage corresponds to a stationary field. The stationary stator field is preferably a stationary magnetic field of a stator of the electric machine. The rotor can advantageously not be set into rotation due to the stationary stator field, in particular magnetic field, wherein the intermediate circuit capacitor is impinged with current by supplying current to the stator coils. This leads to an advantageous heating of the intermediate circuit capacitor.

In a preferred embodiment of the control unit, the processing unit is designed to actuate the power output state as a function of the temperature signal in such a way that a current application pattern generated by the power output stage corresponds to a field having a rotational or alternating frequency which a rotor of the electric machine cannot follow on account of the inertia thereof.

The rotational frequency, which the rotor cannot follow on account of the inertia thereof, can, for example, only correspond to a predetermined rotational direction of the rotor or the field rotation. The rotational frequency can, for example, be empirically ascertained as a function of the inertia.

In another embodiment, the field having alternating frequency, which the rotor cannot follow on account of the inertia thereof, corresponds to a rotating magnetic field which has at least one periodic reversal of rotational direction. The field which the rotor cannot follow can, for example, correspond to a rotational movement or a field rotation of 90 degrees for a first half-wave of the period. For a second half-wave, said field corresponds to a return motion about an angle of 90 degrees in a direction opposite to the forward motion.

In an advantageous embodiment, the current application pattern corresponds to a fast, in particular oscillating, reciprocating motion of the rotor. The rotor can then advantageously not transmit an effective torque to a rotor shaft for driving the vehicle. The supply of current to the electric machine by the power output stage however puts a load on the intermediate circuit capacitor; thus enabling said intermediate circuit capacitor to heat up internally because the voltage drops at a series resistor of said intermediate circuit capacitor so that an effective power is generated in the series resistor that heats up said intermediate circuit capacitor.

The rotor can thus advantageously not be driven by a gentle supporting torque even if the vehicle is set in motion. This results from the fact that the current application pattern corresponds to a reciprocating motion.

In a preferred embodiment, a current application pattern generated by the power output stage corresponds to a field having a periodical reciprocating motion, wherein the reciprocating motion corresponds to a partial rotation, in particular a rotor or field rotation, and a rotor is not able to follow said reciprocating motion due to the inertia thereof. The partial rotation preferably corresponds to a rotor angle of <90 degrees, more preferred less than 10 degrees, particularly preferred less than 5 degrees.

In a preferred embodiment, the control unit comprises a temperature sensor which is connected to the energy store, in particular in a heat-conducting manner and which is designed and disposed to acquire a temperature of the intermediate circuit capacitor and to generate a temperature signal corresponding to said temperature. The processing unit is preferably designed to transfer the power output stage as a function of the temperature signal into an operating state, in which a smaller amount of heat is generated in the intermediate circuit capacitor than at a lower temperature represented by the temperature signal.

The temperature sensor is, for example, formed by a temperature-dependent resistor, which is connected to the intermediate circuit capacitor, in particular to a housing of the intermediate capacitor. The processing unit is preferably connected to the temperature sensor and has an input for the temperature signal. A controller is advantageously formed by the temperature sensor together with the processing unit; and therefore the temperature of the intermediate circuit capacitor can be advantageously maintained in a predetermined temperature interval by means of the lossy actuation of the electric machine previously mentioned.

In a preferred embodiment, the control unit comprises a temperature sensor connected in particular electrically to the energy store, wherein the temperature sensor is designed to detect voltage transients of a voltage dropping across the energy store and to generate the temperature signal as a function of the voltage of the voltage transients. The temperature sensor is preferably connected to electrical connections of the energy store, in particular of the intermediate circuit capacitor. A temperature of the intermediate circuit capacitor can be advantageously acquired by means of a temperature sensor designed in this manner without a separate temperature sensor being connected to a housing or in the proximity of a housing of the intermediate circuit capacitor.

It has in fact been recognized that the voltage which drops across the series resistor of the intermediate circuit capacitor at low temperatures can lead to the previously described voltage transients in the intermediate circuit or in the on-board power supply of the vehicle. Using the temperature sensor designed as described above, the temperature of the intermediate circuit capacitor can be acquired advantageously as a function of the voltage transients and therefore advantageously directly as a function of the undesirable effects of the series resistor of the intermediate circuit capacitor.

The control unit is furthermore preferably designed to control the current application pattern as a function of the voltage transients such that a predetermined peak or mean value of the voltage transients is maintained or not exceeded.

The previously described control using the temperature sensor which can detect the voltage transients advantageously controls the temperature of the intermediate circuit capacitor not as a function of the absolute temperature of the intermediate circuit capacitor but rather advantageously as a function of an undesirable effect of a temperature of the intermediate circuit capacitor. A correlation of the actual series resistance of the intermediate circuit capacitor as a function of the temperature or an absolute temperature of said intermediate circuit capacitor advantageously does not need to be known because the control operation for increasing the temperature can take place until the undesirable effects, namely the voltage transients, have fallen below a predetermined value. The voltage transients, which can produce damage to the on-board power supply when a predetermined value has been exceeded, are thus advantageously held at a harmless low voltage value and also serve as control parameters for an adjustment of the current application pattern, in particular of the pulse width modulation pattern, which has an effect on the heat generated in the intermediate circuit capacitor.

The invention also relates to an electric machine comprising the control unit of the kind described above. The output of the control unit is preferably connected to the stator, in particular to stator coils of the stator. The electric machine also comprises a rotor which is particularly designed to be permanently magnetic.

The invention relates also to a method for heating an intermediate circuit capacitor of an electric machine.

The electric machine comprises a stator, a rotor and a control unit, which includes a power output stage and is connected to the stator.

In the method, the power output stage is preferably actuated to supply current to the stator and to generate a magnetic stator field.

In the methods, it is furthermore preferred that a temperature of an intermediate circuit capacitor, which is connected to the power output stage, is at least indirectly acquired and a temperature signal representing the temperature is generated. In a further preferable manner, the power output stage is actuated as a function of the temperature signal such that the rotor cannot generate a torque as a function of the stator field.

In the method, the field preferably represents a stationary field vector, in particular a magnetic field vector.

The field preferably has—in particular such a fast—rotational or alternating frequency that the rotor cannot follow said frequency due to the inertia thereof.

BRIEF DESCRIPTION OF THE DRAWINGS

The invention is now described below with the aid of figures and further exemplary embodiments.

DETAILED DESCRIPTION

Figure 1:
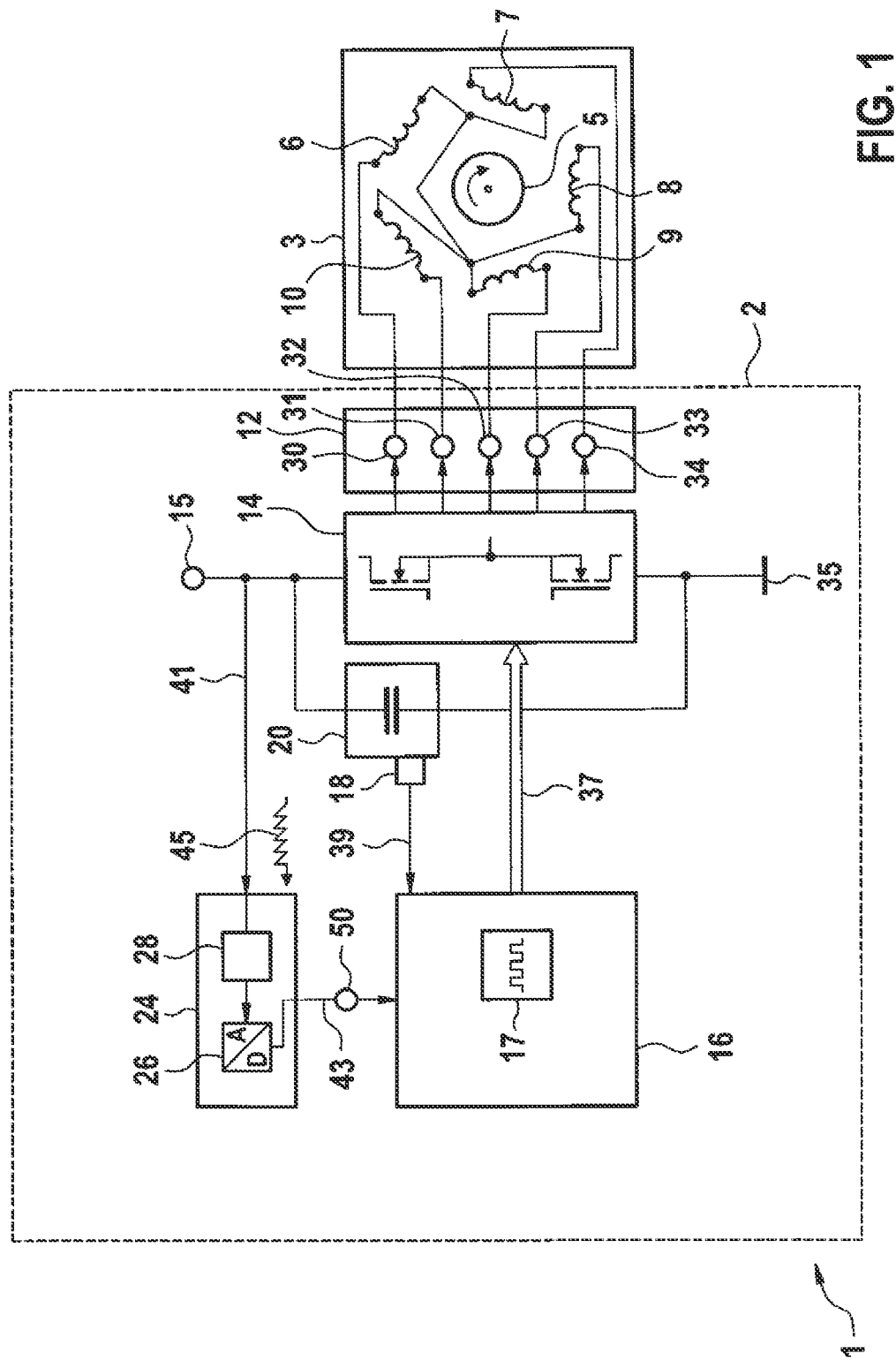
FIG. 1 shows—schematically—an exemplary embodiment for an electric machine comprising an intermediate circuit capacitor and at least one temperature sensor, wherein a temperature sensor is designed to acquire the temperature of the intermediate circuit capacitor as a function of voltage transients of a vehicle's on-board supply voltage.

FIG. 1 shows—schematically—an exemplary embodiment for an electric machine 1. The electric machine 1 has a stator 3 and a rotor 5. In this exemplary embodiment, the stator 3 comprises five stator coils, namely the stator coils 6, 7, 8, 9 and 10. The stator coils of the stator 3 are connected to each other in a star connection in this exemplary embodiment. The stator coils of the stator 3 can also be interconnected with one another in another configuration, also in a pentagon circuit. The electric machine 1 also comprises a power output stage 14. The power output stage 14 is connected on the output side via an output 12 of a control unit 2 of the electric machine 1 to the stator 3 and there to the stator coils.

In this exemplary embodiment, the output 12 has a terminal for each stator coil of the stator 3. The output 12 has in this exemplary embodiment a terminal 30 for the stator coil 6, a terminal 31 for the stator coil 10 a terminal 32 for the stator coil 9, a terminal 33 for the stator coil 8 and a terminal 34 for the stator coil 7. The control unit 2 is connected to the stator 3 in this exemplary embodiment; thus enabling the respective terminals to be connected to the corresponding stator coils.

The power output stage 14 is designed to supply current via the output 12 to the stator coils of the stator 3 for the purpose of generating a magnetic rotating magnetic field. To this end, the power output stage 14 is connected to a terminal 15 for an on-board power supply voltage. The power output stage 14 is also connected to a ground connection 35. The power output stage 14 is connected on the input side via a—multichannel—connection 37 to a processing unit 16. The processing unit 16 is designed to generate control signals for actuating control terminals of semiconductor switches of the power output stage 14—in this exemplary embodiment field-effect transistors are used as semiconductor switches of the power output stage 14—and to send said control signals via the connection 37 to the power output stage 14 for actuating the semiconductor switches. The processing unit 16 can thus actuate the power output stage 14 to generate the stator field by means of generating a corresponding actuation model. The stator field can be a rotating magnetic field in the case of an operation of the electric machine 1 as an electric motor. The processing unit 16 can—as a function of temperature signal 45 received at an input 50—generate an actuation model which corresponds to a stationary magnetic field so that the rotor 5 as a function of the stationary magnetic field can not be set into rotary motion. During this actuation operation, an electrical power output is converted in the stator coils so that an intermediate circuit capacitor 20 connected to the power output stage 14 is loaded and can be heated by means of the electrical loading thereof.

The intermediate circuit capacitor 20 of the electric machine 1 is connected to the terminal 15 for the on-board power supply voltage and to another terminal comprising the ground connection 35.

The processing unit 16 comprises a pulse width modulator in this exemplary embodiment for generating the previously mentioned actuation model. The pulse width modulator is designed to generate a pulse-width modulated, periodic square wave signal, the square wave signals for the stator coils being in a predetermined phase relationship to each other. The square wave signals, in particular the phase relationship thereof, which as a function of the temperature acquired at input 50 are different from one another, consequently bring about a rotary motion of the rotor 5 or a standstill of said rotor 5 while the stator coils of the stator 3 are being supplied with current.

The control unit 2 of the electric machine 1 also comprises a temperature sensor 18 in this exemplary embodiment, which sensor is connected to the intermediate circuit capacitor 20, in particular to a housing of said intermediate circuit capacitor 20. The temperature sensor 18 is connected on the output side via a connecting cable 39 to the processing unit 16. The temperature sensor 18 is designed to acquire a temperature of the intermediate circuit capacitor 20, to generate a temperature signal corresponding to the temperature and to send said temperature signal on the output side via the connecting cable 39 to the processing unit 16. The temperature sensor 18 is, for example, a temperature-dependent resistor. In this exemplary embodiment, the control unit 2 comprises—independently of the temperature sensor 18 or in addition to said temperature sensor 18—a temperature sensor 24. The temperature sensor 24 is connected on the input side to the terminal 15 and is designed to detect voltage transients 45 of an operating voltage, in this exemplary embodiment of the on-board power supply voltage. The operating voltage also drops in this exemplary embodiment across the intermediate circuit capacitor 20 which forms in this exemplary embodiment the aforementioned energy store of the control unit.

The temperature sensor 24 is connected on the input side via a connecting cable 41 to the terminal 15 for the on-board power supply voltage and can receive the voltage transients 45 via said terminal 15.

To this end, the temperature sensor 24 comprises a peak-hold element 28 which is connected on the output side to an analog digital converter 26. The analog digital converter 26 is connected on the output side via a connecting cable 43 to the input 50 of the processing unit 16.

The temperature sensors 18 and 24 can be implemented conjointly or independently of one another in the control unit 2.

The processing unit 16 is, for example, formed by a microprocessor, a microcontroller, a FPGA (FPGA=field programmable gate array) or an ASIC (ASIC=application specific integrated circuit).

The actuation signals generated by the processing unit 16, in particular by the pulse width modulator 17, are depicted by way of example in the following FIGS. 3 to 5.

Figure 2:
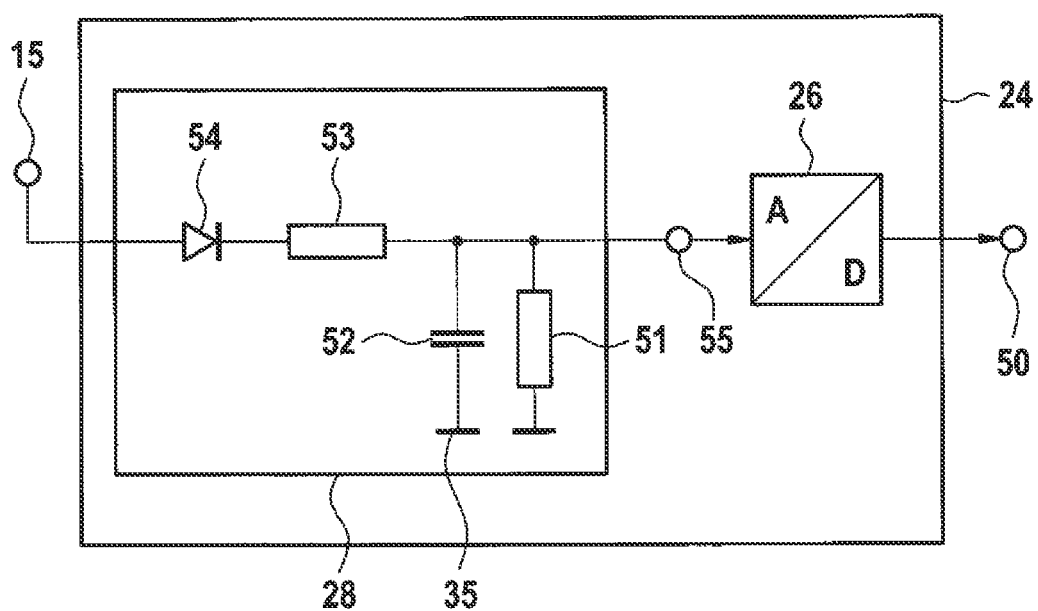
FIG. 2 shows an exemplary embodiment of a circuit arrangement for a temperature sensor which is formed by a peak voltage sensor for detecting voltage transients and is designed to acquire the temperature of the intermediate circuit capacitor indirectly as a function of the voltage transients.

FIG. 2 shows an exemplary embodiment for the temperature sensor 24 already depicted in FIG. 1. The analog digital converter 26 is depicted, which is connected on the output side to the input 50 and on the input side to an output 55 of the peak-hold unit 28. The peak-hold unit 28 is connected on the input side to the terminal 15.

The peak-hold unit 28 is designed to acquire an operating voltage present at terminal 15, to ascertain a peak value of the operating voltage and to output the peak value on the output side at output 55. The peak-hold unit 28 comprises in this exemplary embodiment a diode 54 that is connected to the terminal 15, said diode 54 being connected via a resistor 53 in series to the output 55.

The peak-hold unit 28 also comprises a storage capacitor 52 which is connected to a terminal comprising the output 55 and to another terminal comprising the ground connection 35. A further output resistor 51 is connected in parallel with the capacitor 52.

The voltage dropping across the output resistor 51—in relation to the ground connection 35—can be received on the input side and converted from analog to digital by the analog digital converter 26.

The diode 54 acts as a rectifier diode in the peak-hold unit 28. The resistors 53 and 51 together form a voltage divider. The output resistor is designed to be of high impedance such that a voltage stored by the capacitor 52 corresponds to the peak value of the on-board power supply voltage received on the input side, less the voltages dropped across the diode 54 and the resistor 53. A resistance value of the output resistor 51 is selected in particular larger than the resistance value of the resistor 53; thus enabling a slow discharging of the capacitor 52 to occur.

Figure 3:
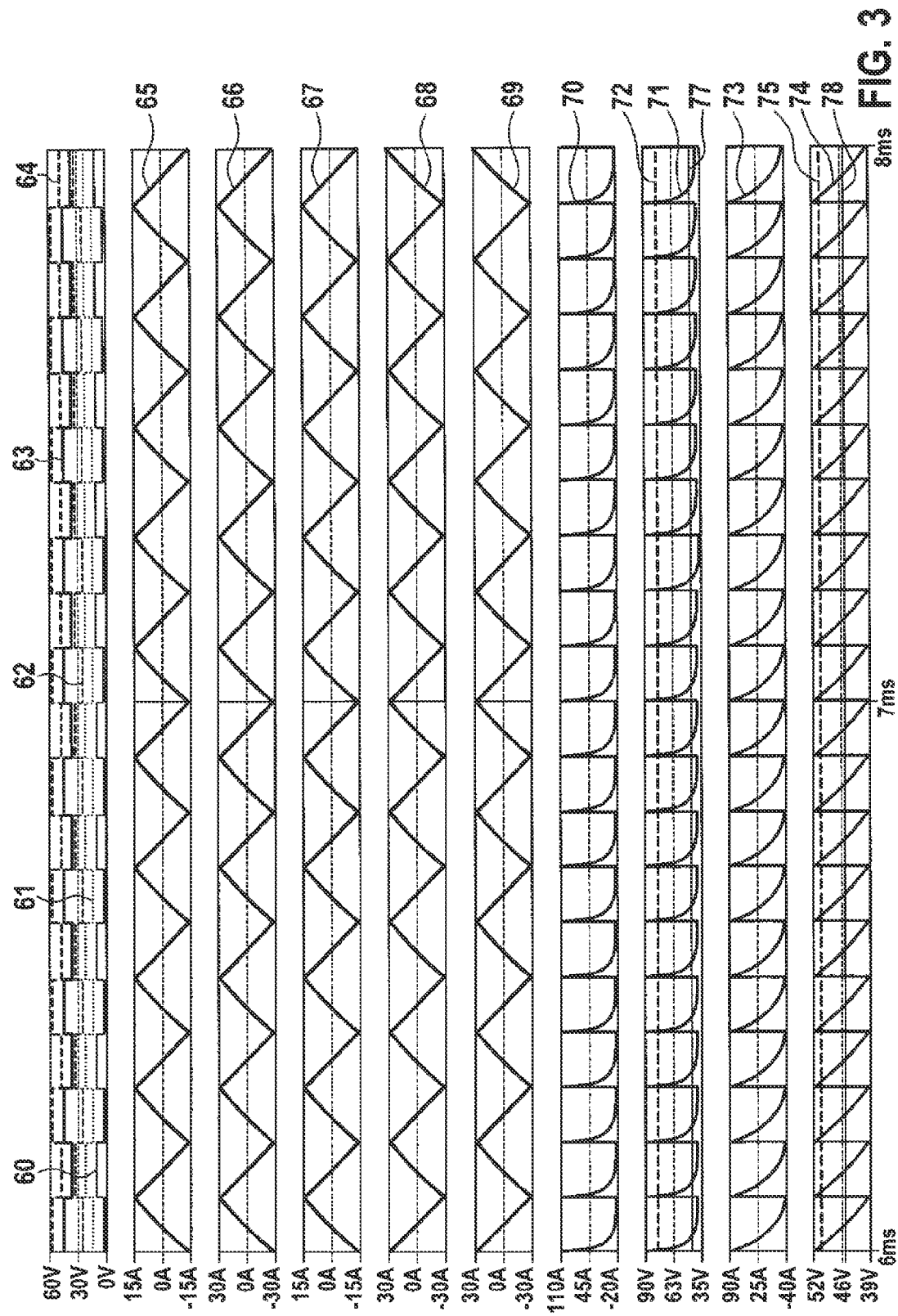
FIG. 3 shows a diagram comprising an actuation model from a processing unit of the electric machine depicted in FIG. 1 and the currents generated as a function of the actuation model as well as the voltage transients.

FIG. 3 depicts with the aid of a diagram the actuation signals which were previously described and are generated by the pulse width modulator 17. Said actuation signals include in particular the voltage pulses that correspond to the square wave signals and are generated by the power output stage 14 in FIG. 1, the currents in the stator coils of the stator 3 that correspond to the voltage pulses, the corresponding current profile in the intermediate circuit capacitor 20 of the control unit 2 depicted in FIG. 1 and the voltage transients of the on-board power supply voltage. The depicted voltage curves thereby represent actuation models, represented by voltage curves, for generating actuation signals for actuating the transistor half-bridges of the power output stage 14 in FIG. 1. A positive excursion in a voltage curve corresponds to switching on a high-side transistor of the transistor half-bridge. A negative excursion in a voltage curve corresponds to switching on a low-side transistor of the transistor half-bridge. The transistor half-bridge is thereby associated with a stator coil and is connected to the same on the output side.

A voltage curve 60 of the stator coil 6, a voltage curve 61 of the stator coil 7, a voltage curve 62 of the stator coil 8, a voltage curve 63 of the stator coil 9 and a voltage curve 64 of the stator coil 10 are depicted. The low-side transistors of the stator coils 6, 7 and 8 are jointly switched on, whereas the low-side transistors of the stator coil 9 and 10 are blocked during the same half period. During a succeeding half period, the low-side transistors of the stator coils 6, 7 and 8 are blocked, whereas the low-side transistors of the stator coils 9 and 10 are switched on.

The currents corresponding to the actuation models previously described are depicted with the curves 65, 66, 67, 68 and 69 of the stator coils which each exhibit a triangular course. The current profile 65 of the stator coil 6, the current profile 66 of the stator coil 7 and the current profile 67 of the stator coil 8 are jointly situated in phase. The currents of the remaining stator coils, namely the stator coil current 68 of the stator coil 9 and the stator coil current 69 of the stator coil 10, run phase shifted by 180 degrees with respect to the aforementioned phase.

A current profile 70 of a current flowing through the intermediate circuit capacitor 20 in FIG. 1 is also depicted. According to said current profile 70, the current through the intermediate circuit capacitor increases periodically in a jump-like manner and drops exponentially. This results in a voltage ripple of the on-board power supply voltage at terminal 15, which voltage ripple is depicted by the voltage curve 71. The on-board power supply voltage fluctuates thereby between 35 and 90 volts. The current of the intermediate circuit capacitor varies thereby between minus 20 amperes and plus 110 amperes. The current profile 70 of the intermediate circuit capacitor current and the voltage curve 71 of the on-board power supply voltage correspond in this case to an ambient temperature of minus 40 degrees. The intermediate circuit capacitor 20 in FIG. 1 has likewise the temperature of minus 40 degrees. A peak voltage value generated at the input 50 of the temperature sensor 24 and represented by the voltage curve 72 is also depicted. The peak voltage value can be ascertaine—for example by the processing unit 16—as the difference to a mean value of the on-board power supply voltage, which mean value is represented by a voltage curve 77. To this end, the voltage sensor 24 in FIG. 1, in particular the peak-hold unit 28, can be designed to acquire the mean value of the on-board power supply voltage. The mean value can, for example, be acquired by means of an additional RC circuit of the peak-hold unit 28. The RC circuit comprises a resistor and a capacitor connected in series with the resistor, wherein a voltage dropping across the capacitor forms the output voltage representing the mean value.

A current profile 73 of the intermediate capacitor current and a voltage curve 74 of the on-board power supply voltage are also depicted at an ambient temperature of minus 10 degrees. The intermediate circuit capacitor current, represented by the current profile 73, fluctuates thereby between minus 40 amperes and plus 90 amperes. A resulting mean value of the current profile of the phase current is zero; and therefore an output torque is zero. An effective value of the intermediate circuit capacitor current lies however in this exemplary embodiment at 25 amperes. The voltage transients of the on-board power supply voltage, represented by the voltage curve 74, thereby fluctuate as a function of the intermediate circuit capacitor current profile 73 between 39 volts and 52 volts. An acquired peak voltage value, generated by the temperature sensor 24, is depicted by the voltage curve 75. A difference between the acquired peak voltage value and the actual peak voltage value results from an inertia of the circuit arrangement specified in FIG. 2. A voltage curve 78 exhibits a mean value of the voltage curve 74.

Figure 4:
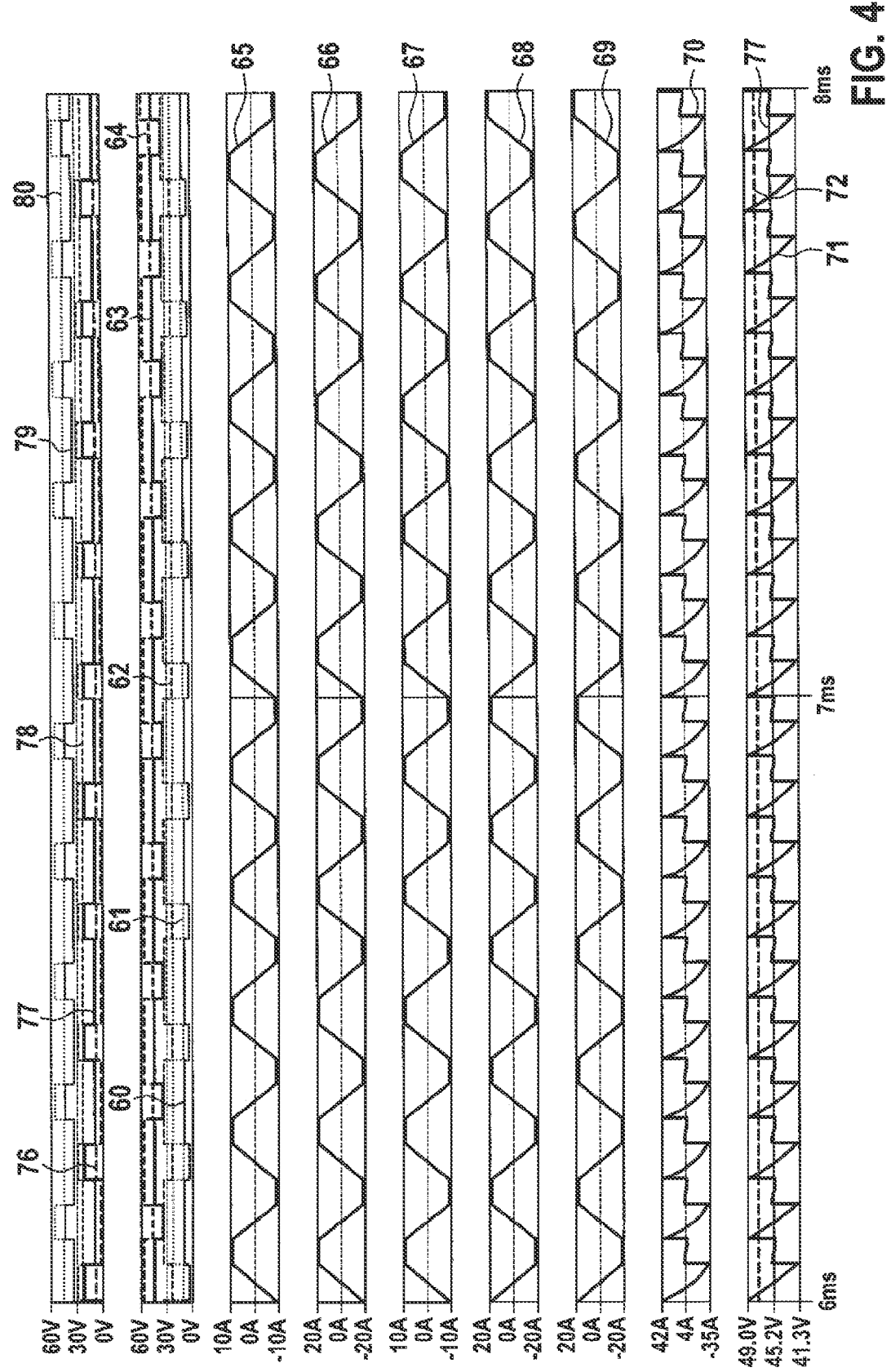
FIG. 4 shows a diagram comprising an actuation model from a processing unit of the electric machine depicted in FIG. 1 and the currents generated as a function of the actuation model as well as voltage transients which in comparison to the actuation models of FIG. 3 have been generated with another actuation model having a smaller pulse width of the pulses for switching on the transistor half-bridges.

FIG. 4 shows a variant of an actuation model with respect to current in the stator coils of the stator 3, which is generated by the processing unit 16, in particular by the pulse width modulator 17, wherein the actuation model generated in this manner corresponds to a stationary rotor magnetic field. The rotor 5 of the electric machine 1 depicted in FIG. 1 can thereby not be set into rotary motion. The following are depicted: a voltage curve 60 for actuating the low-side transistor for the stator coil 6, the voltage curve 61 of the low-side transistor for the stator coil 7, the voltage curve 62 of the low-side transistor for the stator coil 8, the voltage curve 63 of the low-side transistor for the stator coil 9 and the voltage curve 64 of the low-side transistor for the stator coil 10. The following are also depicted: a voltage curve 76 of a high-side transistor of the stator coil 6, a voltage curve 77 of the high-side transistor for the stator coil 7, a voltage curve 78 of the high-side transistor for the stator coil 8, a voltage curve 79 of the high-side transistor for the stator coil 9 and a voltage curve 80 of the high-side transistor for the stator coil 10.

The actuation models depicted with the diagram in FIG. 4 correspond with respect to the phase relationships of the actuation signals for the stator coils of the stator 3 in FIG. 1 to those already depicted in FIG. 3 with the difference that the high-side transistors during a switched-on state are switched on only for half of a half period, that is to say during a quarter of a full period.

The processing unit 16 depicted in FIG. 1 is designed to change the high-side proportion of the actuation signals as a function of the temperature signal received at the input side, which signal represents the temperature of the intermediate circuit capacitor, in particular is designed to set said high-side proportion of the actuation signals between 50 percent and 100 percent of a half period. By setting said high-side proportion to 100 percent, the actuation model pursuant to FIG. 4 changes over to an actuation model pursuant to FIG. 3.

The shortening of the switch-on time interval of the high-side transistor during a half period of the pulsed actuation causes a limitation of the currents through the stator coils and therefore a limitation of the current through the intermediate circuit capacitor, represented by the curve progression 70 in FIG. 4.

The current profiles 65, 66, 67, 68 and 69 of the stator coil currents have in each case as a function of the actuation model which corresponds by means of the previously described voltage curves a limited, flattened peak value. The current through the intermediate circuit capacitor, represented by the curve 70 in FIG. 4, fluctuates between minus 35 and plus 42 amperes. By means of the pulse-width modulated actuation control of the high-side transistors, the current through the intermediate circuit capacitor can be regulated as a function of the temperature signal by the processing unit.

The voltage transients of the on-board power supply voltage, represented by the voltage curve 71 in FIG. 4, thereby fluctuate between 41.3 volts and 49 volts. The peak value of the on-board power supply voltage which is acquired by the temperature sensor 24 in FIG. 1 and represented by the voltage curve 72 is also depicted.

Unlike what is depicted in FIG. 4, a control of the current of the intermediate circuit capacitor can also occur by a phase shift of the actuation models, represented by the voltage curves 60 and 61 in comparison to the actuation models for the remaining stator coils—controlled by the processing unit 16 in FIG. 1.

That produces a control of the intermediate circuit current up to all stator coils being simultaneously switched on or blocked, wherein no torque is generated but neither does an intermediate circuit current flow.

Figure 5:
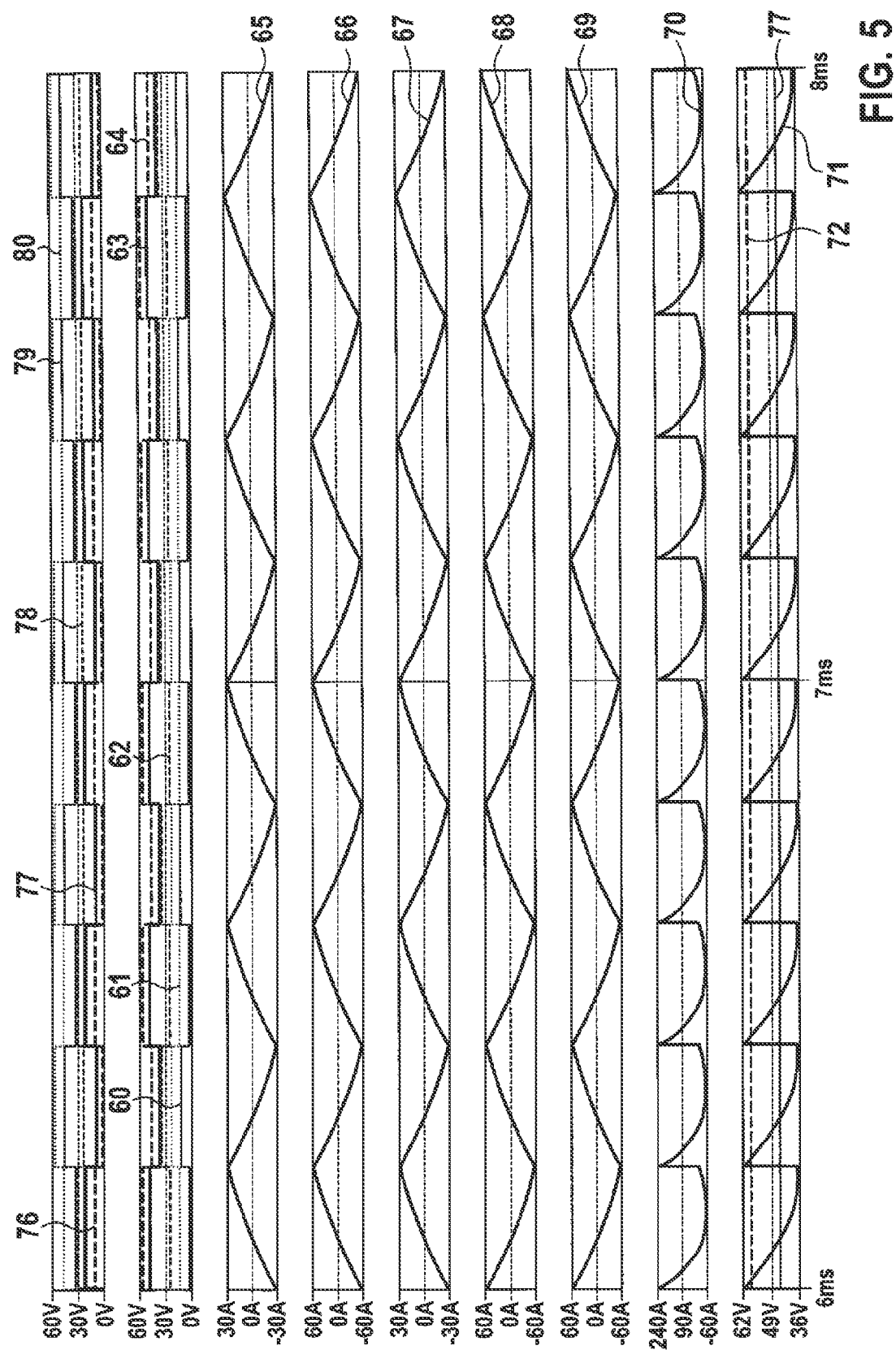
FIG. 5 shows a diagram comprising a control pattern from a processing unit of the electric machine depicted in FIG. 1 and the currents generated as a function of the actuation model as well as the voltage transients, wherein an actuation frequency of the actuating signals is half that of the actuation model of FIG. 1.

FIG. 5 shows a variant of actuation signals which have been generated by the processing unit 16. Said variant is represented by the voltage curves of the previously described high-side and low-side transistors for the stator coils 6, 7, 8, 9 and 10 of the stator 3 of the electric machine 1 in FIG. 1.

The voltage curves having the same reference numerals as in FIG. 4 thereby correspond to the voltage curve of the corresponding high-side transistor or, respectively, low-side transistor.

The processing unit 16 is designed to change an actuation frequency of the pulse-width modulated actuation signals, in particular by means of the pulse width modulator 17. FIG. 5 shows the actuation signals, which in comparison to the actuation signals in FIG. 3 have half the frequency. The halving of the frequency of the actuation signals causes an increase in the stator coil currents, shown by the curves of the stator coil currents 65, 66, 67, 68 and 69 which each have twice the peak value in comparison to the stator coil currents in the actuation pursuant to FIG. 3. The current through the intermediate circuit capacitor, represented by the current profile 70 in FIG. 5, fluctuates between 60 amperes and 240 amperes. An effective value lies at 70 amperes. A resulting mean value of the current profile of the stator coil currents is zero so that an output torque is zero. The voltage transients of the operating voltage, represented by the voltage curve 71, thereby fluctuate between 36 volts and 62 volts.

The processing unit 16 in FIG. 1 is, for example, designed to change the frequency of the pulse-width modulated actuation as a function of the voltage transients of the voltage dropping across the intermediate circuit capacitor. For example, a predetermined peak value of the voltage transients can thereby not be exceeded. Consequently, there is a lower value for an actuation frequency which corresponds to a maximum value of the peak voltage of the voltage transients. By means of a control limited in this manner, too high an increase in the voltage transients can advantageously be prevented during a control process using the processing unit 16 in FIG. 1. Hence, electronic components of the control unit or of the electric machine 1 cannot be destroyed by the peak values of the voltage transients.

The invention claimed is:

1. A control unit for an electric machine, the control unit comprising:
    a processing unit;
    a power output stage connected to the processing unit, wherein the power output stage is connected to an output for stator coils of a stator of the electric machine and the processing unit is designed to supply current to the power output stage for generating a stator field;
    an electrical energy store connected to the power output stage, wherein;
    an input for a temperature signal; and
    a temperature sensor which is connected to the energy store and is designed and disposed to acquire a temperature of the energy store and to generate a temperature signal corresponding to the temperature,
    wherein the processing unit is designed to actuate the power output stage as a function of the temperature signal such that the energy store can be heated by a current application pattern generated by the power output stage and the current application pattern corresponds to a field which cannot generate a full revolution of a rotor of the electric machine,
    wherein the temperature sensor is designed to detect voltage transients of a voltage dropping across the energy store and to generate the temperature signal as a function of the voltage of the voltage transients.

2. The control unit according to claim 1, wherein the processing unit is designed to actuate the power output stage as a function of the temperature signal such that a current application pattern generated by the power output stage corresponds to a stationary stator field.

3. The control unit according to claim 1, wherein a current application pattern generated by the power output stage corresponds to a field having a periodic reciprocating motion, wherein the forward and/or return motion does not correspond to a full revolution of the rotor.

4. The control unit according to claim 1, wherein the control unit is designed to control the current application pattern as a function of the voltage transients such that a predetermined peak value of the voltage transients is maintained or not exceeded.

5. An electric machine comprising a control unit according to claim 1, wherein the electric machine including a rotor and a stator connected to the output, wherein the processing unit is designed to actuate the power output stage as a function of the temperature signal such that a current application pattern generated by the power output stage corresponds to a field having a rotational or alternating frequency which the rotor cannot follow due to the inertia thereof.

6. The electric machine according to claim 5, wherein a current application pattern generated by the power output stage corresponds to a field having a rotational or alternating frequency which the rotor cannot follow due to the inertia thereof, said field having at least one periodic reversal of rotational direction.

7. A method for heating an intermediate circuit capacitor of an electric machine having a stator, a rotor, a control unit, and a power output stage, wherein the power output stage is actuated to supply current to the stator and to generate a magnetic stator field, the method comprising:
    acquiring at least indirectly a temperature of the intermediate circuit capacitor;
    detecting voltage transients of a voltage dropping across an energy store;
    generating a temperature signal as a function of the voltage of the voltage transients representing the temperature; and
    actuating the power output stage as a function of the temperature signal such that the rotor cannot generate a torque as a function of the stator field.

8. The method according to claim 7 in which the field represents a stationary field vector.

9. The method according to claim 8, in which the field has a rotational or alternating frequency which the rotor cannot follow due to the inertia thereof.

* * * * *